(12) United States Patent
Li et al.

(10) Patent No.: US 9,916,636 B2
(45) Date of Patent: Mar. 13, 2018

(54) DYNAMICALLY PROVISIONING AND SCALING GRAPHIC PROCESSING UNITS FOR DATA ANALYTIC WORKLOADS IN A HARDWARE CLOUD

(71) Applicant: International Business Machines Corporation, Armonk, NY (US)

(72) Inventors: Min Li, San Jose, CA (US); John Alan Bivens, Ossining, NY (US); Koushik K. Das, New York, NY (US); Ruchi Mahindru, Elmsford, NY (US); Harigovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/093,965

(22) Filed: Apr. 8, 2016

(65) Prior Publication Data
US 2017/0293994 A1 Oct. 12, 2017

(51) Int. Cl.
G06F 9/50 (2006.01)
G06T 1/20 (2006.01)
G06T 15/00 (2011.01)

(52) U.S. Cl.
CPC .............. *G06T 1/20* (2013.01); *G06F 9/5083* (2013.01); *G06T 15/005* (2013.01)

(58) Field of Classification Search
None
See application file for complete search history.

(56) References Cited

U.S. PATENT DOCUMENTS 8,706,869 B2    4/2014   Campion et al.
8,954,698 B2    2/2015   Schenfeld et al.
(Continued)

OTHER PUBLICATIONS

Donfack et al,"Dynamically balanced synchronization-avoiding LU factorization with multicore and GPUs," INSPEC/IEEE: 2014, Dec. 2014.
(Continued)

*Primary Examiner* — Joni Richer
(74) *Attorney, Agent, or Firm* — Jeffrey S. LaBaw; David H. Judson

(57) ABSTRACT

Server resources in a data center are disaggregated into shared server resource pools, including a graphics processing unit (GPU) pool. Servers are constructed dynamically, on-demand and based on workload requirements, by allocating from these resource pools. According to this disclosure, GPU utilization in the data center is managed proactively by assigning GPUs to workloads in a fine granularity and agile way, and de-provisioning them when no longer needed. In this manner, the approach is especially advantageous to automatically provision GPUs for data analytic workloads. The approach thus provides for a "micro-service" enabling data analytic workloads to automatically and transparently use GPU resources without providing (e.g., to the data center customer) the underlying provisioning details. Preferably, the approach dynamically determines the number and the type of GPUs to use, and then during runtime auto-scales the GPUs based on workload.

26 Claims, 8 Drawing Sheets

(56) References Cited

U.S. PATENT DOCUMENTS

| | | | | |
|---|---|---|---|---|
| 9,513,934 | B2* | 12/2016 | Sarkar | G06F 9/445 |
| 2010/0007646 | A1* | 1/2010 | Tsuei | G06F 1/3203 |
| | | | | 345/212 |
| 2011/0083131 | A1 | 4/2011 | Pirzada et al. | |
| 2011/0197048 | A1* | 8/2011 | Chung | G06F 9/5083 |
| | | | | 712/30 |
| 2011/0227934 | A1* | 9/2011 | Sharp | G06F 9/5044 |
| | | | | 345/502 |
| 2013/0160016 | A1 | 6/2013 | Gummaraju | |
| 2014/0181807 | A1 | 6/2014 | Fonseca et al. | |
| 2014/0184613 | A1* | 7/2014 | Exterman | G06T 1/20 |
| | | | | 345/501 |

OTHER PUBLICATIONS

IBM, "Method for Dynamically Balancing Computer Graphics Workload between Host Workstation Central Processing Unit and Dedicated Graphics Adapter," ip.com No. 000114904, Feb. 1, 1995.

IBM, "An Analytic Capacity Planning Performance and Cost Modeling Technique for Cloud Computing Environments," IBM; ip.com No. 000190621, Dec. 8, 2009.

Anonymous, "Workload Optimization through Dynamic Reconfiguration of Computer Nodes," ip.com No. 000215416, 2014.

Abali et al, "Disaggregated and optically interconnected memory: when will it be cost effective?," Mar. 3, 2015.

* cited by examiner

DYNAMICALLY PROVISIONING AND SCALING GRAPHIC PROCESSING UNITS FOR DATA ANALYTIC WORKLOADS IN A HARDWARE CLOUD

BACKGROUND OF THE INVENTION

Technical Field

This disclosure relates generally to data processing systems in a data center operating environment.

Background of the Related Art

A well-known information technology (IT) delivery model is software-based cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP. Cloud compute resources typically are housed in large server farms that run one or more network applications, typically using a virtualized architecture wherein applications run inside virtual servers, or so-called "virtual machines" (VMs), that are mapped onto physical servers in a data center facility.

The notion of "big data" refers to collections of data sets that are too large or complex for processing (e.g., analysis and visualization) using conventional database management tools or traditional data processing applications. While on-premises environments for processing such data sets exist, they are costly to provision and maintain, and thus many enterprises are looking to cloud-based or -supported analytic environments. To this end, it is also known to provide hardware-based high performance computing (HPC) environments that include graphics processing units (GPUs) to facilitate modeling and simulation. One such environment that is available commercially is IBM® SoftLayer®. Modern GPUs are very efficient at image processing, and their highly-parallel structure makes them more effective than general-purpose CPUs for algorithms where the processing of large blocks of visual data is done in parallel. In a hardware cloud environment, GPUs work in conjunction with a server's CPU to accelerate application and processing performance. In particular, CPU offloads compute-intensive portions of the application to the GPU, which processes large blocks of data at one time rather than sequentially, thereby boosting the overall performance in a server environment. GPUs are better for high performance computing than CPU's alone because of the thousands of small efficient cores designed to process information faster. Cloud servers with GPU cards easily handle compute-intensive tasks and deliver a smoother user experience when leveraged for virtualization. In IBM SoftLayer, customers can choose to provision different types of graphic cards that best meet the needs of their workloads.

A hardware cloud can outperform a software cloud, e.g., by providing zero downtime and fast hardware replacement, as well as customized and on-line hardware reconfiguration. While the above-described hardware cloud-based approaches provide significant advantages and facilitate cloud-based processing of analytic workloads, currently GPU-based resource provisioning in such clouds is done statically. Moreover, workloads in these environments are assigned to particular GPUs, leading to low GPU utilization when the requirements of the workload vary.

There remains a need to provide enhanced techniques to provision and scale GPUs dynamically for data analytic workloads in a cloud-based environment.

BRIEF SUMMARY

According to a first aspect of this disclosure, a method for processing a workload in a compute environment having a pool of graphics processing units (GPUs) is described. The method begins upon receiving a request to process the workload. In response to receipt of the request, a GPU configuration (or "allocation") anticipated to be required to process the workload is determined. The GPU configuration comprises a set of GPU requirements. Based on the set of GPU requirements, available GPUs drawn from the GPU resource pool are then assigned to process the workload. As the workload is being processed by the GPUs assigned, the GPU configuration is dynamically adjusted, preferably as determined by monitored resource consumption of the workload.

According to a second aspect of this disclosure, an apparatus for processing a workload in a compute environment having a pool of graphics processing units (GPUs) is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for processing a workload in a compute environment having a pool of graphics processing units (GPUs) is described. The computer program product holds computer program instructions executed in the data processing system and operative to perform operations such as the steps described above.

According to a fourth aspect of this disclosure, a data center facility is described. The data center facility comprises a set of server resource pools. The server resources pools comprise at least a graphics processing unit (GPU) resource pool. A GPU sizing component executes in a hardware processor and is responsive to receipt of a request to process a workload to determine a GPU configuration. The data center facility further includes at least one disaggregated compute system comprising GPUs selected from the GPU resource pool to satisfy the GPU configuration. A GPU scaling component executes in a hardware processor and is responsive to receipt of resource consumption information as the workload is executing to scale-up or scale-down the GPU configuration.

The approach of this disclosure improves GPU utilization in a data center by assigning GPUs to workloads in a fine granularity and agile way, and de-provisioning them when no longer needed. In this manner, the approach is especially advantageous to automatically provision GPUs for data analytic workloads. The approach thus provides for a "micro-service" enabling data analytic workloads to automatically and transparently use GPU resources without providing (e.g., to the customer) the underlying provisioning details. Preferably, the approach dynamically determines the number and the type of GPUs to use, and then during runtime auto-scales the GPUs based on workload.

Thus, according to this technique GPU resources are allocated in a fine grain and dynamic manner, preferably based on application (workload) characteristics. When the workload does not need GPU during the execution, these resources are re-allocated to other workloads. Preferably, when the auto-scaling component determines that GPUs can be de-allocated, those GPUs are first returned to the GPU resource pool so that they then become available to support other workload(s) being processed by the hardware cloud. The fine-grained GPU allocation is not limited to reducing GPU resources of course. Indeed, there may be circumstances during the runtime when the system determines the GPU configuration determined by the GPU sizing component is inadequate. Generalizing, the system dynamically increases or decrease the number of GPUs during the workload executions. As will be appreciated, the approach herein provides for dynamic GPU resource allocation in a disaggregate system by adding and removing GPUs based on application needs.

Preferably, the data center in which the techniques are implemented comprises a set of server resource pools. A disaggregated compute system to process a workload comprises processors selected from the compute pool, computer memories selected from the memory pool, GPUs selected from the GPU resource pool, and preferably an optical interconnect.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator (e.g., GPU accelerator, network accelerator, etc.) pool, a storage pool, and so forth. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, a disaggregated compute system in which the teachings of this disclosure are practiced utilizes optical (as opposed to electrical) interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Switching Optically-Connected Memory Architecture

By way of background, but not by way of limitation, the following describes a representative computer environment in which the techniques of this disclosure (described below) may be practiced.

Figure 1:
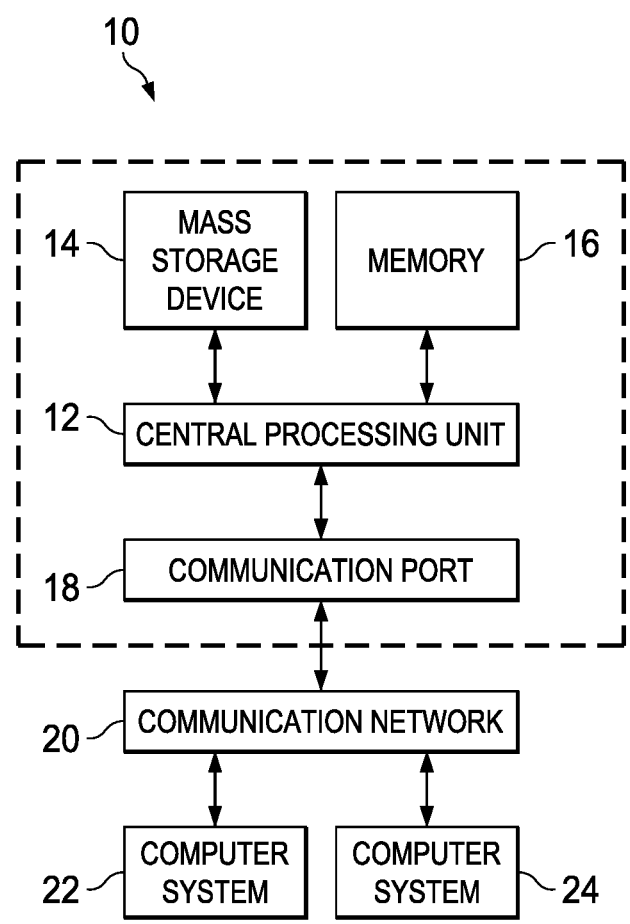
FIG. 1 depicts an exemplary block diagram illustrating a computing system environment in which exemplary aspects of the disclosure may be implemented.

Turning now to FIG. 1, exemplary architecture 10 of a computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
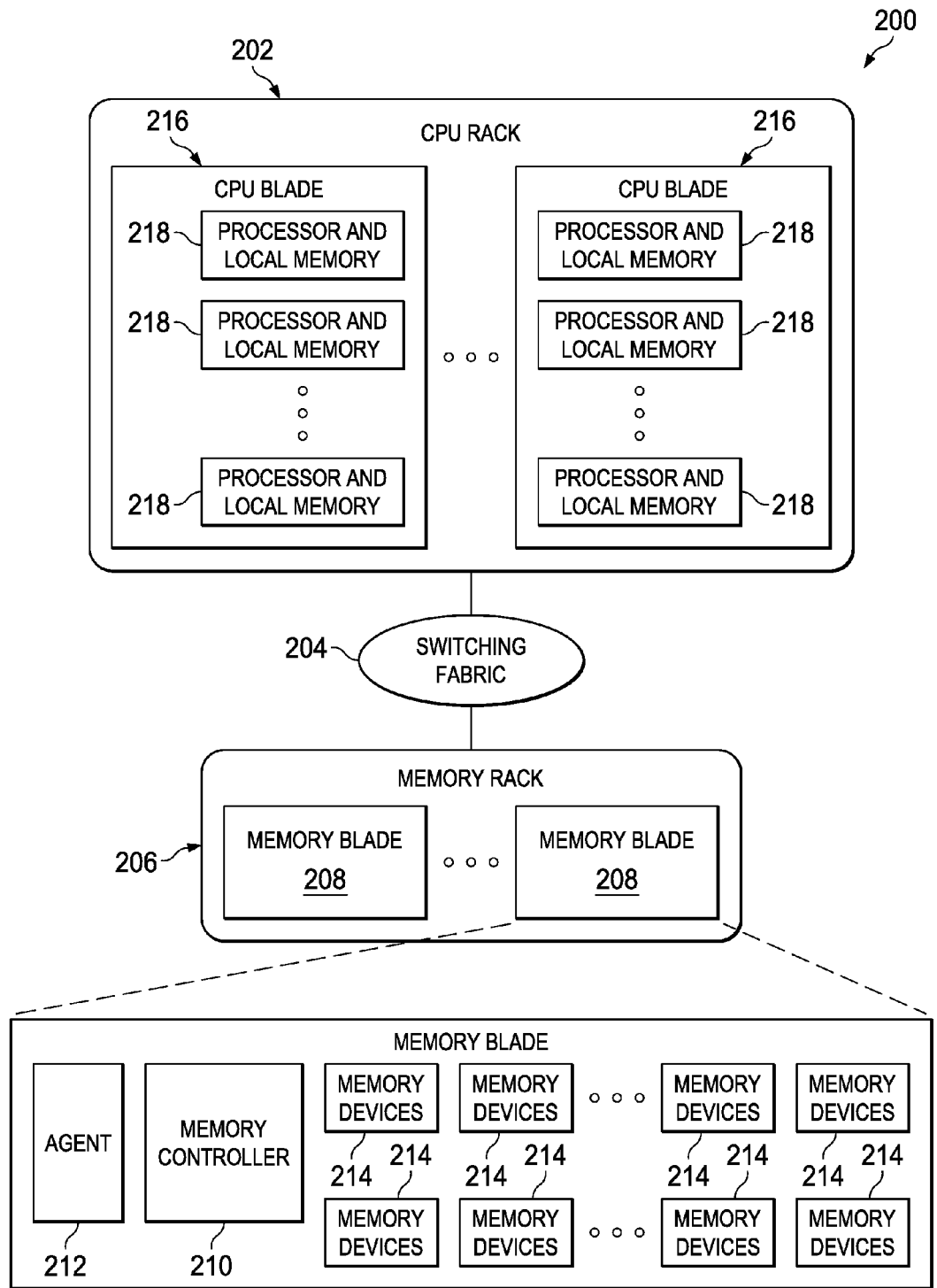
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310*a-n*, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
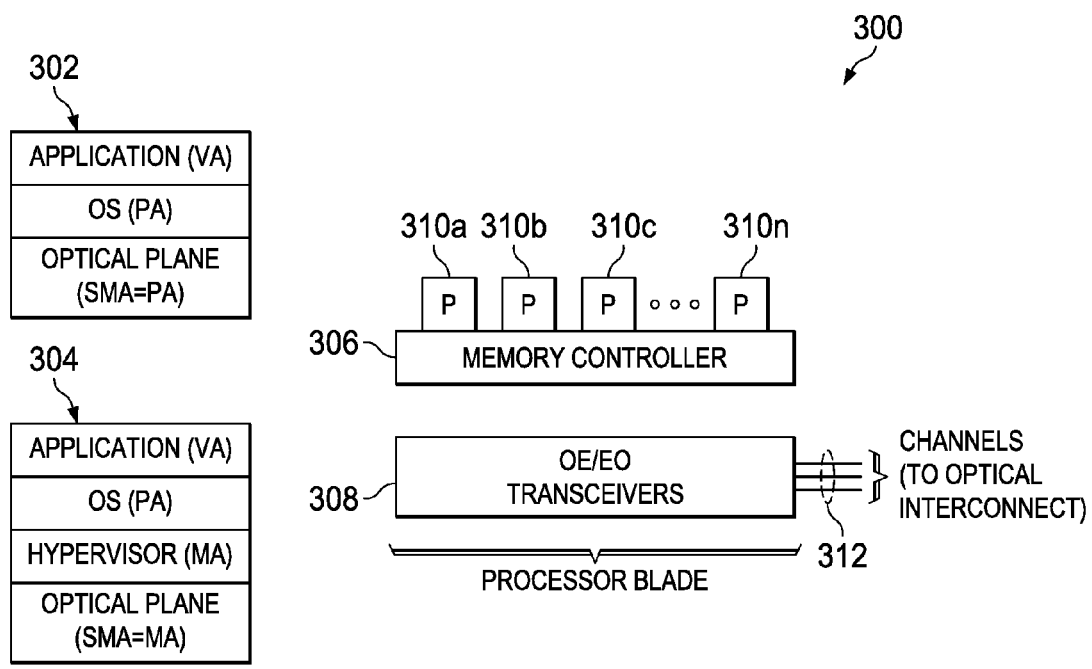
FIG. 3 depicts a block diagram illustrating a hardware structure of a processor design in the optically-connected memory system in FIG. 2.
Figure 4:
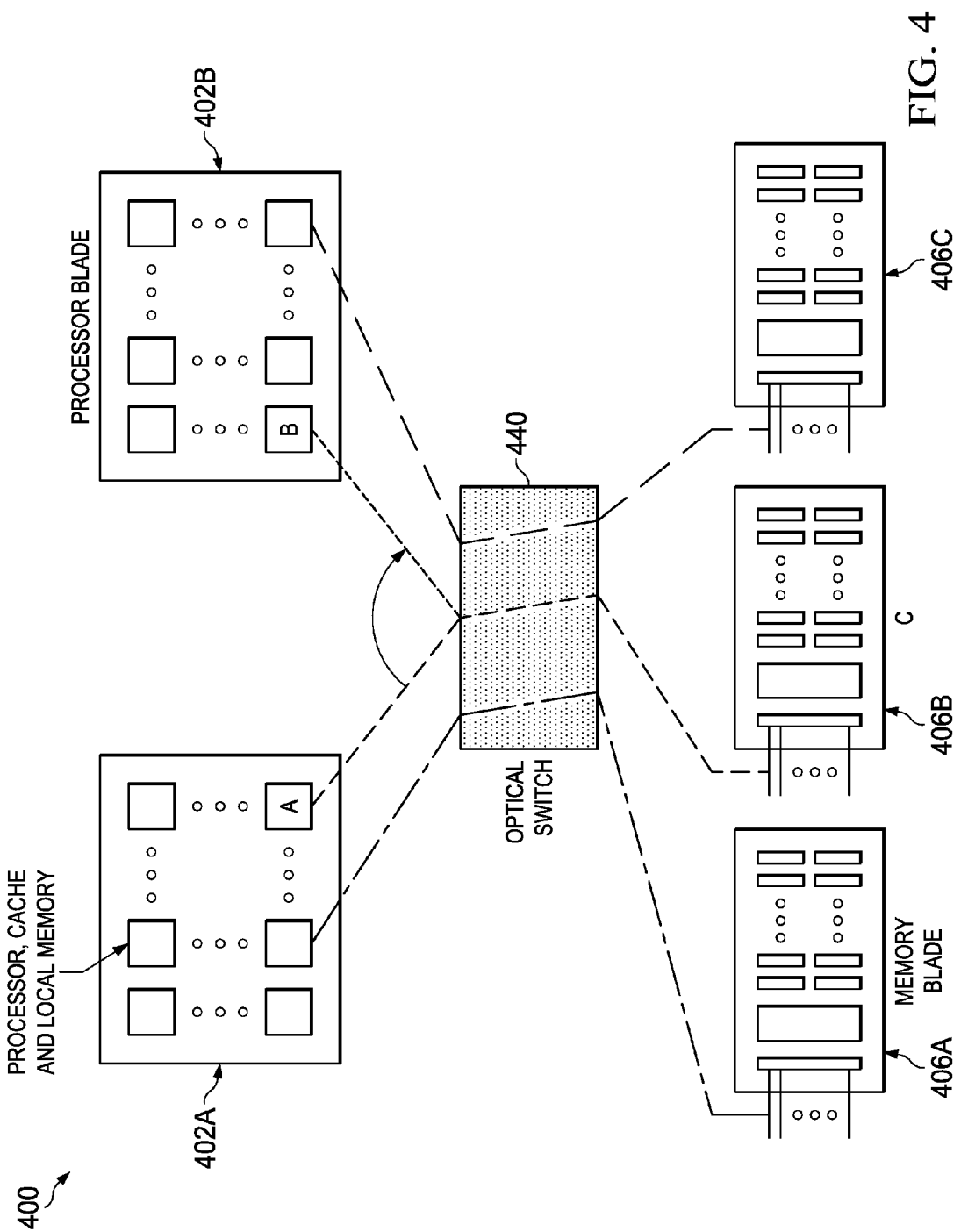
FIG. 4 is a block diagram illustrating a hardware structure for accessing memory at the processor.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), (b) the processor blade communicates with remote memory blades through optical transceiver 308 and 312. There is a memory controller 306 associated with local memory pool 310*a-n*. If a System Memory Address (SMA) space (as shown in 302 and 304 of FIG. 3) is above a certain, predefined limit, the SMA is mapped to a Remote Memory Address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

In an optically-connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 402A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

While the above-described compute environment (sometimes referred to herein as a "hardware cloud") is preferred, it is not intended to be limiting. A disaggregated compute system may be implemented in whole or in part in a data center that also provides a conventional cloud computing model of service delivery. Thus, for completeness, the following section provides additional details regarding software-based cloud computing.

Cloud Computing

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the IBM Security Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
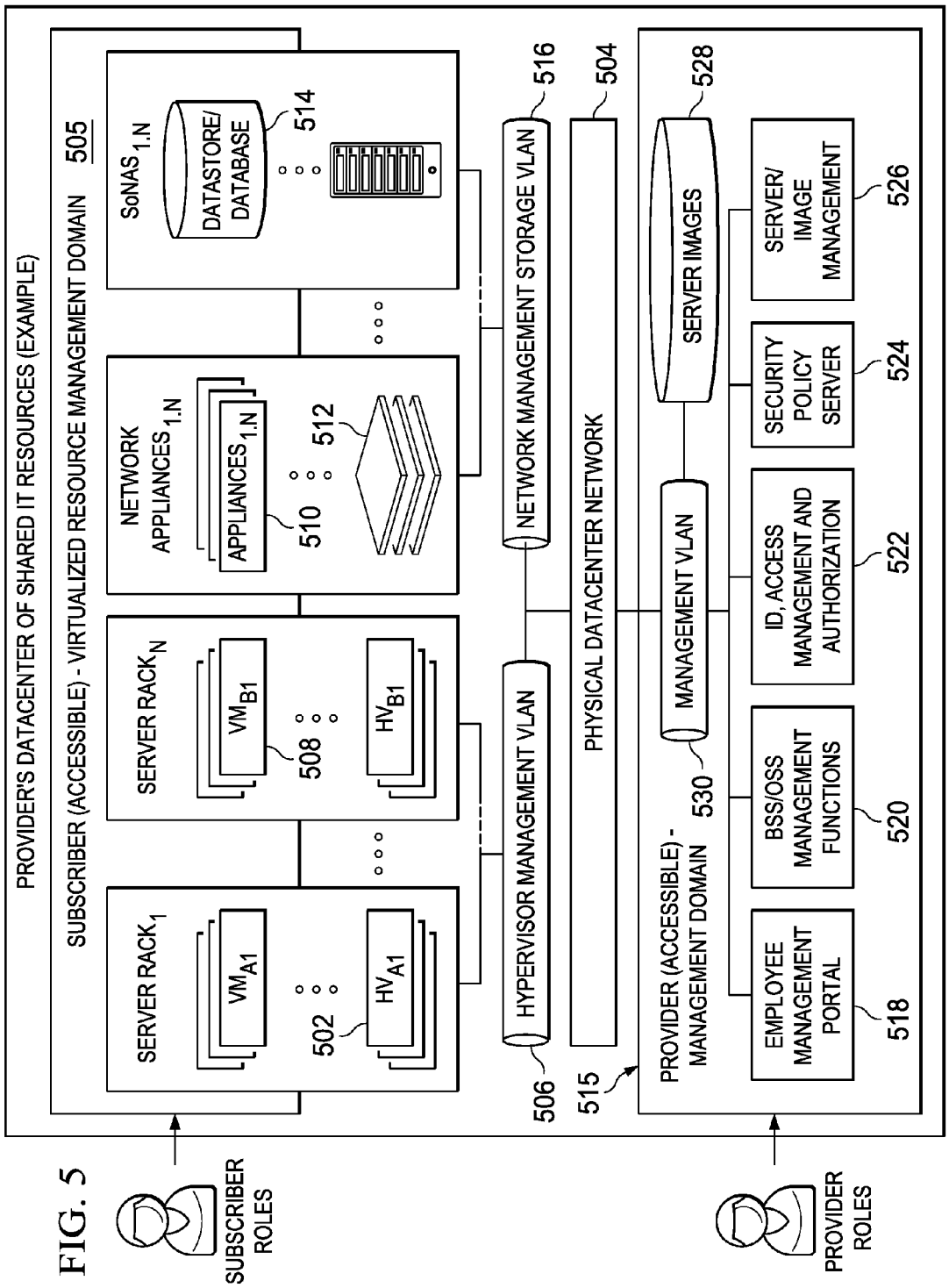
FIG. 5 depicts a disaggregated compute system according to this disclosure.

FIG. 5 illustrates a typical IT infrastructure that supports virtualization of resources and in which the below-described techniques of this disclosure also may be implemented in whole or in part. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 518, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Dynamically Provisioning and Scaling GPUs for Data Analytic Workloads

With the above description providing several representative operating environments, the techniques of this disclosure are now described. In a preferred embodiment, the techniques are implemented within a hardware cloud environment, such as a disaggregated compute system wherein server resources in or across the data center are "disaggregated" into shared server resource pools, namely, one or more of: a compute pool, a memory pool, a GPU accelerator pool, a storage pool, and the like. Servers are constructed dynamically, for example, on-demand and based on workload requirements, by allocating from these resource pools. A disaggregated compute system of this type keeps track of resources that are available in the shared server resource pools, and manages those resources based on that information.

Figure 6:
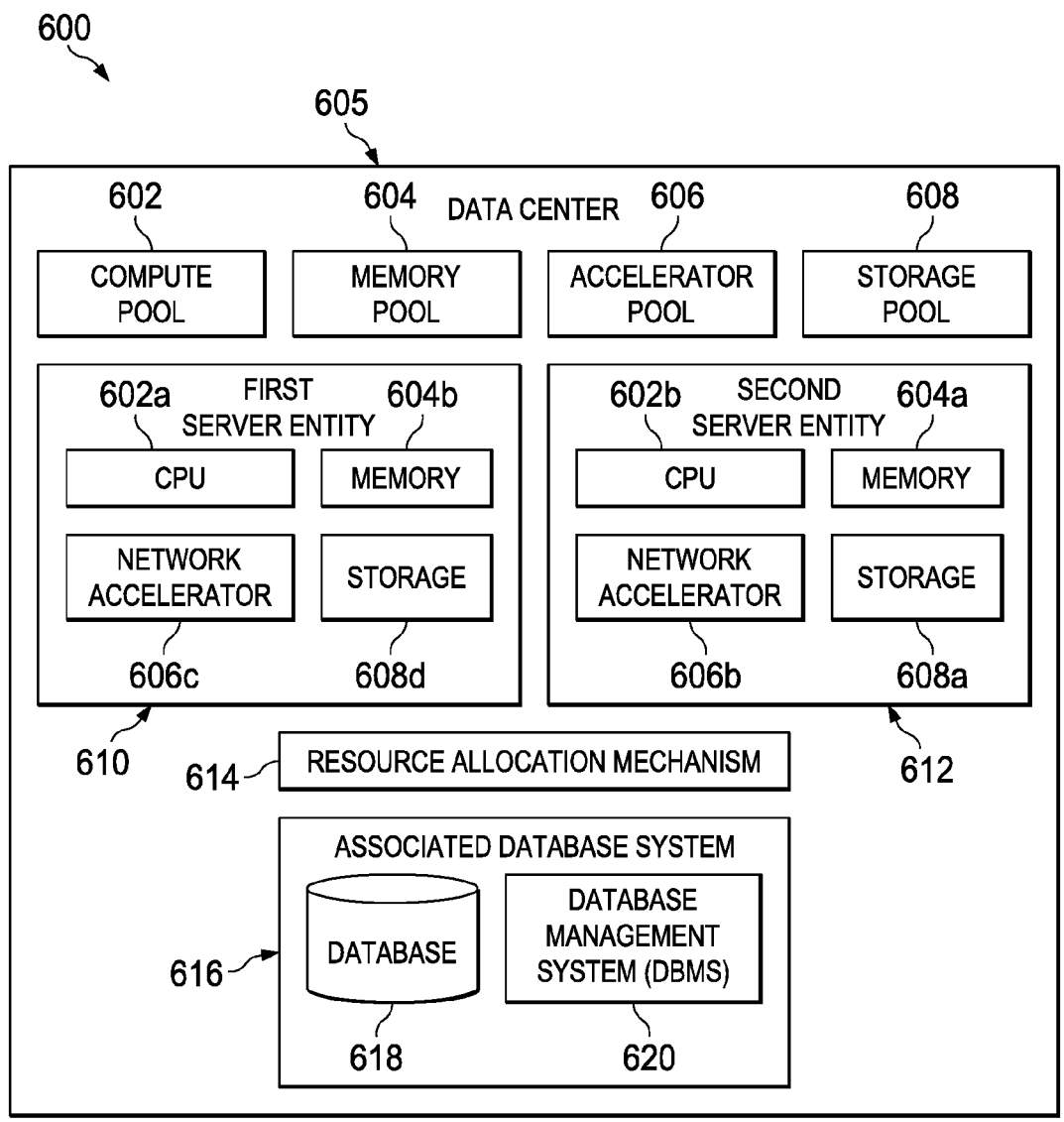
FIG. 6 depicts an alternative data center architecture in which the techniques of this disclosure may be implemented.

A representative disaggregated compute system 600 is shown with reference now to FIG. 6. In one embodiment, the disaggregated compute system 600 is configured within a data center 605 in which a switching optically-connected memory architecture is used. This architecture was described above in the context of FIGS. 1-4, but it is not intended to be limiting. In the disaggregated compute system 600, there are shared server pools, e.g., a compute pool 602, a memory pool 604, a GPU accelerator pool 606, a storage pool 608, and perhaps others. There may be a single instance of a resource pool, or multiple such instances (sometimes referred to as "multiple pools"). In the approach, particular servers that service customer workloads are constructed dynamically, for example, on-demand and based on workload requirements, by allocating from these resource pools. Thus, for example, a first server entity 610 may comprise CPU 602a (selected or otherwise obtained from compute pool 602), memory 604b (selected or otherwise obtained from memory pool 604), GPU accelerator 606c (selected or otherwise obtained from GPU accelerator pool 606), and storage 608d (selected or otherwise obtained from storage pool 608). A second server entity 612 may comprise CPU 602b, memory 604a, GPU accelerator 606b and storage 608a. These examples are merely representative. The particular server pool resources that comprise a given server entity may change.

Preferably, once a particular resource of a resource pool (e.g., a GPU accelerator) is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 600 has the capability to keep track of resources that are available in the shared server resource pools and that are allocated or de-allocated to the various server entities. To this end, the disaggregated compute system 600 comprises (or has associated therewith) a tracking system comprising a resource allocation mechanism 614, and an associated database system 616. Generally, the tracking system is implemented as a data processing system, and it may operate in a standalone manner or as a component of some other system or functionality in the data center.

Typically, the resource allocation mechanism 614 is implemented in software, namely, as set of computer program instructions, executing in one or more hardware processors. The resource allocation mechanism 614 may comprise one or more sub-systems or modules, processes, programs or execution threads, and such components may be co-located or distributed. The resource allocation mechanism 614 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources to the existing server entity when less capacity is needed to handle the workload. One or more of such functions may be combined, and other types of algorithms may be implemented by the resource allocation mechanism 614.

The one or more algorithms that comprise the resource allocation mechanism 614 used information stored in the database system 616 to carry out the management functions. As noted above, the database system 616 stores information that tracks the state, status or other properties and attributes of the various resources in the shared server pools. In addition, preferably the database stores information about each server entity built by the resource allocation mechanism. Generalizing, and as well-known, the database system 616 comprises a database 618, namely, a collection of data organized in one or more ways (e.g., via schemas, tables, queries, report, views and other objects), together with a database management system (DBMS) 620, which is a computer software application that interacts with the user, other applications, and the database to capture and analyze data. A general purpose DBMS enables the definition, creation, querying, update and administration of databases. A representative DBMS is IBM® DB2®.

In one embodiment, the database 618 is relational. The database stores a data record (or, more generally, a data set) that, for each defined server entity, identifies the resources that comprise the server. Preferably, the data record is associated with an identifier, a unique server ID, and each resource that comprises the server is associated in the database with that unique server identifier. Thus, continuing with the example described above, the first server entity 610 may be associated with unique server $ID_1$, while the second server 612 may be associated with user server $ID_2$, and so forth.

Preferably, the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 602a, memory 604b, GPU accelerator 606c and storage 608d are associated (by relational tables or otherwise) with unique server ID1, which is the unique server identifier for the first server entity 610. Likewise, and continuing with the second example, the various resource-specific identifiers for the CPU 602b, memory 604a, GPU accelerator 606b and storage 610a are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

As noted above, there may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 614 and the database system 616 work together to manage the disaggregated compute system. The resource allocation mechanism functions as a tracking system that keeps track of idle and used CPUs, memory, GPU accelerator and other components that define a server. Additionally, the tracking system keeps a record for each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

The algorithms used for resource selection (new server allocation, server scale-up and server scale-down) can use common criteria to facilitate the selection, or these algorithms can differ from one another, e.g., based on the resource topology and the purpose of resource allocation. When resources are interconnected, more flexibility in allocated resources is available to the system. For resources that are not directly interconnected, preferably the algorithm(s) consider the hierarchy of resources, as well as other factors, such as number of hops, latency, cost and so forth. In the latter case, preferably the algorithm tries to minimize the number of hops.

With the above as background, the techniques of this disclosure are now described.

Figure 7:
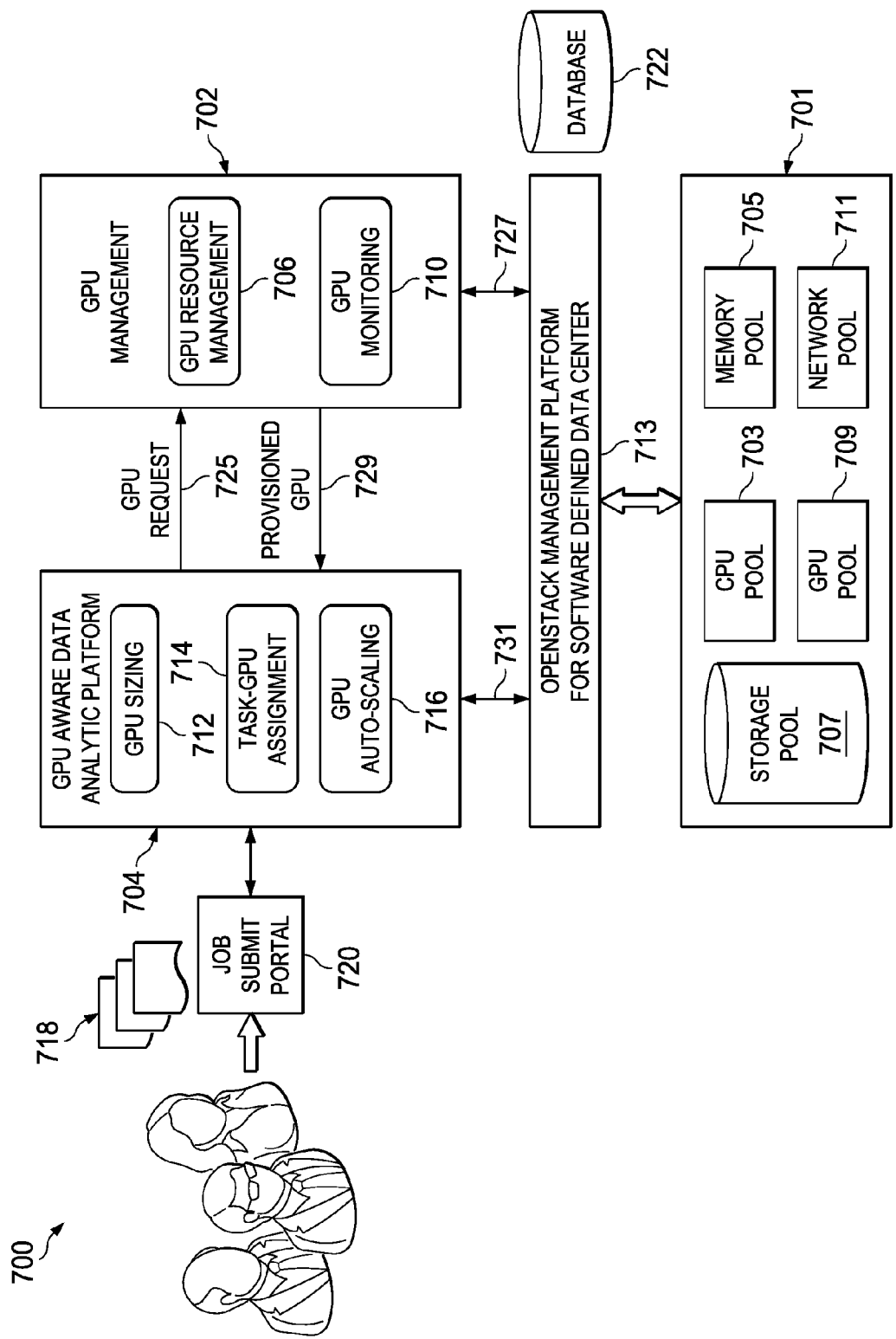
FIG. 7 depicts a GPU provisioning and scaling system according to this disclosure.

According to this disclosure, GPUs from a GPU accelerator pool are dynamically provisioned and scaled, e.g., to handle data analytic workloads in a hardware cloud. FIG. 7 depicts a representative embodiment of a GPU provisioning and scaling system that implements this functionality. As depicted, and again as background, the data center 701 comprises the various sets of resource pools, such as CPU pool 703, memory pool 705, storage pool 707, GPU pool 709 and network pool 711. These pools comprise the different types of resources from which a server is provisioned. A management platform 713 (e.g., IBM Cloud OpenStack Services) may provide an application programming interface (API) to these data center resource pools. According to this disclosure, the GPU management and scaling system 700 preferably comprises several sub-systems, GPU resource management components 702, and a GPU-aware data analytic platform 704.

The GPU management components 702 comprise a GPU resource management module 706, which allocates and de-allocates GPU resources from the GPU pool 709. The components 702 also include a GPU monitoring module 710, which keeps track of the health status and resource utilization of the GPU resources that are provisioned. The GPU-aware data analytic platform 704 comprises a GPU sizing module 712, which decides the number and type of GPUs to use for a particular workload. There may be one or more GPU types, such as NVIDIA® Tesla™, NVIDIA GRID™ graphic cards, or the like. The platform 704 preferably also includes a task-to-GPU assignment component 714, which assigns tasks within a workload to GPUs, e.g., based on workload characteristics, a task scheduling policy, or the like. Further, the platform 704 preferably also includes a GPU auto-scaling module 716, which retrieves monitoring information from the GPU monitoring module 710 and auto scales-up or -down the GPU resources in a fine granularity given the capability of the hardware cloud, changes to the workload, and the like, as will be described below.

A workload 718 to be processed typically is a data analytic workload, although the particular type of workload is not a limitation of this disclosure. The workload 718 may be submitted for processing manually, e.g., via job submission portal 720, or programmatically, via an API or other interface. A workload database 722 associated with the data analytic platform 704 stores information about one or more other workloads that have been processed by the system. For a given workload, the workload database preferably also stores certain information including, without limitation, one or more of: workload characteristics, the .jar (or other file type) file comprising the workload itself, data that has been collected (e.g. by the GPU monitoring component) about prior GPU allocations/de-allocations, data about the GPU-friendliness of the workload, data size, execution time, and so forth. In addition, the workload database 722 may store still other information from which GPU sizing determinations can be made, e.g., one or more GPU-performance models. Further, the workload database 722 may provide one or more sizing "templates" that may be used for provisioning default or base-level GPU configurations (allocations). Thus, a particular workload that has been processed by the system (or that represents a default) has an associated workload profile.

The particular number of GPUs and their type(s) that comprise a GPU configuration may vary depending on the requirements of a workload to be processed. The type(s) and number(s) of GPUs are sometimes referred to herein as "GPU requirements." The GPU requirements may be influenced by one or more other factors, such as cost, latency, and the like. A basic goal of the system is to select the GPUs (from the GPU resource pool) that match (e.g., according to some "best fit" criteria) the GPU requirements that are determined for the workload, and then to dynamically adjust the GPU configuration (allocation) as required during run-time processing of the workload.

Figure 8:
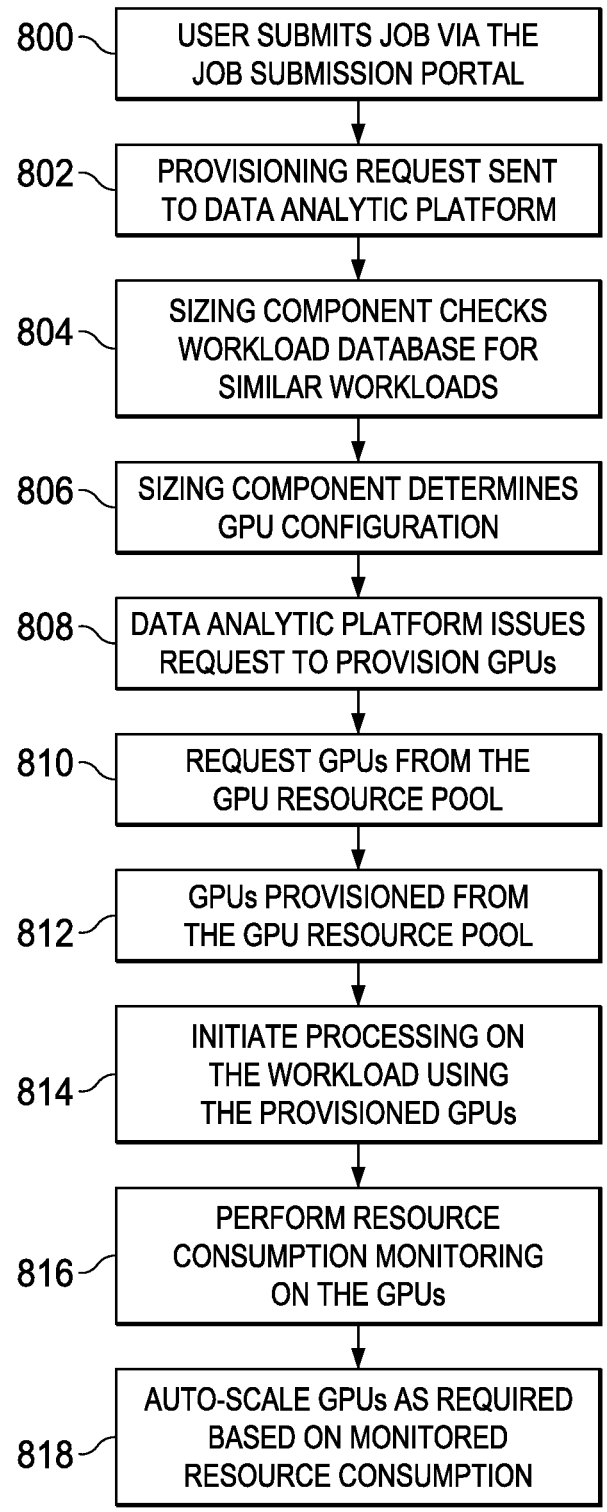
FIG. 8 depicts a process flow for a GPU provisioning and scaling process according this disclosure.

FIG. 8 depicts how the system is used to provision and manage GPU resources with respect to a workflow, such as a data analytic workload. As depicted in FIG. 8, at step 800 a user submits a job, e.g., via the job submission portal. The request typically includes various identifying characteristics for the workload, such as data size, desired execution time, and other data that might impact anticipated processing of the workload. At step 802, a request (asking for the provisioning details of the GPU(s) to handle the workload) is sent to the GPU-aware data analytic platform 704, where it is picked up by the GPU sizing module 712. At step 804, the GPU sizing component 712 checks the workload database 722 to determine whether the workload that is the subject of the current request is similar to (or shares other given characteristics) to one or more of the workloads that have been previously processed. The workload profile(s) stored in the workload database 722 may be used to facilitate this comparison. In other words, preferably the system takes advantage of prior workload executions to find a "good fit" (of GPU type and size) for the workload associated with the request at issue. Step 804 may also include the GPU sizing component 712 carrying out test runs to decide whether the workload (associated with the new request) is GPU-friendly. A workload may be considered to be GPU-friendly if (based on its characteristics, the results of the test runs, and so forth) it is anticipated to work well in conjunction with a server's CPUs to accelerate application and processing performance, shorten computational cycles, etc.

The process then continues at step 806 with the GPU sizing component 712 making a determination on how many GPUs, and what type of GPU, are needed. In the data analytics context, a goal is to reduce the workload execution time. Thus, the particular determination about the number of GPUs (and their type) typically is deterministic once the nature and size of the workload is determined and evaluated against the workload profiles stored in the workload database 722 or otherwise considered via the test runs, or some combination of the existing workload profiles and the information that results from the test runs. At step 808, data analytic platform issues a request (FIG. 7, at 725) to the GPU management component 702 to provision the GPUs needed. In response, and at step 810, the GPU resource management component 706 then issues a request (FIG. 7, at 727) via the management platform 713 in FIG. 7 to provision the GPU from the GPU resource pool 709. The GPUs required are then provisioned from the resource pool at step 812. At step 814, processing on the workload is then initiated. At step 816, the GPU monitoring initiates resource consumption monitoring from the provisioned GPUs. The information obtained by the GPU monitoring component 710 informs the data analytic platform 704 about how well the GPUs provisioned for the workload are performing, e.g., whether they are keeping up with the workload requirements, whether the GPUs are under-provisioned, over-provisioned, or the like.

As noted above, one of the advantages of the GPU provisioning system of this disclosure is the capability to respond dynamically to changes in the workload, and/or the data center itself. To this end, the GPU auto-scaling module 714 operates to automatically scale-up and/or scale-down the number of GPUs used by the workflow, for example, based on the monitored resource consumption information provided by the GPU monitoring component 710. To this end, information collected by the GPU monitoring component 710 is communicated to the GPU auto-scaling component 716, as depicted in FIG. 7 at 729. Based on the monitored information (and, optionally, information collected about the health and status of other resources in the cloud), the auto-scaling component 714 performs an auto-scaling computation, such as depicted in step 818 in FIG. 8. As a result of the computation, the data GPU auto-scaling component then instructs the management platform 713 (FIG. 7, 731) to scale-up or -down the GPU resources being used for the workload.

The auto-scaling operation preferably is carried out continuously or periodically as the workload is processed. In the alternative, or as an adjunct to the continuous/periodic approach, the auto-scaling operation is carried out asynchronously, e.g. based on receipt of an event (e.g., an alarm, a notification from some other resource or system) or other occurrence in the compute cloud.

Generalizing, the system preferably monitors the GPU resources provisioned from initiation of the workload processing until that processing is complete, and those GPU resources may then be allocated/de-allocated dynamically (by the auto-scaling component) "on-the-fly" to ensure the best fit for the circumstances. As noted above, preferably the goal of the processing is to carry out the workload over the shortest-possible workload execution time, but this factor may be influenced by one or more other considerations, such as execution cost, GPU location, time-of-day, other resource availability constraints, combinations of these factors, etc. Thus, in certain circumstances it may be desirable to tradeoff execution time for some other factor, and preferably the auto-scaling operation performs the allocation/de-allocation of GPU resources using one or more scaling algorithms or processes. The particular algorithm that may be used is not a limitation of this disclosure.

Workload requirements may vary in time, and thus particular GPUs assigned for the job may not be needed throughout the duration of the job. The auto-scaling function adjusts for such changes dynamically, returning GPUs to the resource pool when they are no longer needed during the runtime processing.

As a further aspect, a particular workload (or some portion thereof) may be determined to be more GPU-friendly than some other workload (or portion). In such case, the GPU-friendly notion refers to the fact that the type of processing required by the workload (or task therein) is more suitable for GPU processing than, say, processing in a central processing unit (CPU), or otherwise. In such case, GPU-friendly workloads (or portions) would be assigned to the GPUs, while the GPU-unfriendly workloads (or portions) would be assigned for processing elsewhere, e.g., by the CPUs. Thus, in one example embodiment, the hardware cloud comprises a set of GPUs and a set of CPUs, and GPU-friendly workloads are assigned to respective members of the set of GPUs while GPU-unfriendly workloads are assigned respective members of the set of CPUs. This notion of bifurcating GPU-friendly and -unfriendly workloads (or workload portions) is advantageous, as it ensures that the least number of resources are applied to a particular compute requirement. Of course, and as noted above, the status of a workload as being "friendly" or "unfriendly" might well vary during the runtime execution of the job, and thus the auto-scaling feature adjusts the GPU resources accordingly, in the manner described. Generalizing, another way of characterizing "friendliness" is the extent to which the workload is suitable for processing on the GPUs. A determination of such a value can then be included as one of the GPU requirements.

One of ordinary skill will appreciate that the system as depicted in FIG. 7 may be configured using the individual components, but that this is not a requirement. One or more of the components depicted may be combined with one another, and these components may be co-located or operated in a distributed manner. The various sub-systems may communicate with one another over a network using any convenient transport mechanism or protocol, and these communications may be secured. Typically, each component comprises software (one or more programs or processes) executed on one or more hardware processors.

The actual allocation or de-allocation of the GPUs may be carried out by some other component in the system, e.g., the GPU resource management component. Preferably, and as noted, the system allocates and de-allocates GPUs during workload execution to provide a fine grain GPU resource allocation capability in the hardware cloud.

Preferably, the task-to-GPU assignment component 714 provides an additional degree of fine-grained control. Typically, the task-to-GPU assignment component 714 is consulted by the GPU sizing component 712 during the initial provisioning operation (the determination of the number of GPUs and their types) to assigns tasks within a workload to GPUs, e.g., based on workload characteristics, a task scheduling policy, or the like. The GPU auto-scaling component may also consult with the task-to-GPU component 714 as the auto-scaling operation(s) are performed by the auto-scaling component. Generalizing, both the initial allocation and any modifications to the GPU allocation may take into consideration the information provided by the task-to-GPU assignment component. Such information may or may not accompany the workflow request. When such information is available, it may be used to inform the system about which tasks in the workflow may be off-loaded (in that they represent GPU-friendly computations or may otherwise benefit from GPU-specific processing).

As can be appreciated, the system of this disclosure preferably operates by provisioning and modifying GPU configurations based on workload needs, as opposed to assigning workloads to GPUs statically. The approach provides for efficient GPU provisioning and fine-grained scaling, thereby enhancing the performance of the hardware cloud, and reducing cost. With this approach, neither the cloud provider nor the customer needs to be worried about GPUs being over-provisioned. Within the disaggregated data center, GPUs can be easily and flexibly provisioned and de-provisioned from the GPU resource utilization pool. The approach provides an illusion of infinite GPU resources, which can be accessed and used in a highly-efficient and performant manner, e.g., through a high-bandwidth, low latency optical switch and from anywhere within the data center.

The approach improves GPU utilization by assigning GPUs to workloads in a fine granularity and agile way, and de-provisioning them when no longer needed. In this manner, the approach is especially advantageous to automatically provision GPUs for data analytic workloads. The approach thus provides for a "micro-service" enabling data analytic workloads to automatically and transparently use GPU resources without providing (e.g., to the customer) the underlying provisioning details. As noted, the approach dynamically determines the number and the type of GPUs to use, and then during runtime auto-scales the GPUs based on workload.

Thus, according to this technique GPU resources are allocated in a fine grain and dynamic manner, preferably based on application (workload) characteristics. When the workload does not need GPU during the execution, these resources are re-allocated to other workloads. Preferably, when the auto-scaling component determines that GPUs can be de-allocated, those GPUs are first returned to the GPU resource pool so that they then become available to support other workload(s) being processed by the hardware cloud. The fine-grained GPU allocation is not limited to reducing GPU resources of course. Indeed, there may be circumstances during the runtime when the system determines the GPU configuration determined by the GPU sizing component is inadequate. Generalizing, the system dynamically increases or decrease the number of GPUs during the executions. Preferably, the number of GPUs and the number of CPUs are reconfigured during the workload execution within a microsecond-level latency. As will be appreciated, the approach herein provides for dynamic GPU resource allocation in a disaggregate system by adding and removing GPUs based on application needs.

The techniques described herein provide further significant advantages. They enable initial GPU resources to be appropriately allocated based on projected need, and dynamic scale-up or scale-down of physical capacity without any downtime, and with minimal or no customer impact. Because a server entity preferably is built-up from allocation of a subset of GPUs, only those resources that are needed to handle the workload are used. Further, when scale-up is required, the system obtains the additional GPU resources needed, preferably based on locality considerations (i.e., where the additional GPU resources are) to ensure continued good performance at low cost. Because the approach leverages disaggregated servers, these advantages are enable the data center to realize greater modularity, higher resource utilization, lower costs, and better performance. Indeed, with the emergence of larger data centers and the need for clouds of ever-larger numbers of servers, the approach provides a way for a data center that processes data analytic workloads to operate in a much more cost-effective and reliable manner. Server entities using GPUs are built as needed, and the GPU resources that comprise these entities are varied dynamically as needed. By using shared GPU resource pools and the GPU resource allocation methods described herein, the GPU-based servers are constructed dynamically and on-demand by allocating from these resource pools according to the workload's requirements.

The advantages described herein are provided for by maintaining and using the various GPU resource server pools, and the GPU resource allocation mechanism that enables generation and management of the server entities in the manner described. An embodiment of such an approach that further includes the GPU sizing and GPU scaling components enables the system to provide more robust inventory management over the server resource pools, and to ensure that the GPU scale-up and scale-down algorithms work more efficiently. A still further embodiment of such an approach that also uses the task-to-GPU assignment component provides still additional advantages, as it ensures that the GPU resources that are provisioned are more closely-aligned with the actual tasks that need them.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server including both a hardware cloud (a preferred embodiment), as well as an adjunct (or retrofit) to a software-based cloud.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to data analytic workload management schemes, such as described above.

A variant of this approach is to use the above-described techniques to provision and manage other resource types, such as CPUs, or a combination of GPU-CPUs that may be used to service a particular workload.

As noted, the approach may also be implemented in other than a disaggregated compute environment, such as a conventional data center providing bare metal servers, virtual servers, or combinations thereof. A typical implementation will be a set of bare metal servers provisioned with GPU hardware.

There is no limitation on nature and type of workload that may be processed, although typically the approach is used to complex compute-intensive analytic workloads, as has been described.

The invention claimed is:

1. A method for processing a workload in a compute environment having a pool of graphics processing units (GPUs), comprising:
   receiving a request to process the workload;
   responsive to receipt of the request, determining a GPU configuration anticipated to be required to process the workload, the GPU configuration comprising a set of GPU requirements including a number of GPUs and a type of GPU;
   based on the set of GPU requirements, selecting GPUs from the pool that are available and assigning the selected GPUs to process the workload; and
   as the workload is being processed by the GPUs assigned, dynamically adjusting the GPU configuration as determined by monitored resource consumption of the workload.

2. The method as described in claim 1 wherein the GPU configuration is determined at least in part by determining whether a profile of the workload matches a profile associated with another workload that has been processed in the compute environment.

3. The method as described in claim 1 wherein the GPU configuration is determined at least in part by executing a test GPU configuration.

4. The method as described in claim 1 wherein dynamically adjusting the GPU configuration comprises:
   monitoring resource consumption associated with the GPUs assigned to process the workload; and
   based at least in part on the monitored resource consumption, modifying the number of assigned GPUs.

5. The method as described in claim 1 wherein the set of GPU requirements also include a value representing an extent to which the workload is suitable for processing on the GPUs.

6. The method as described in claim 1 wherein the GPU requirements are adjusted in accordance with one or more tasks in the workload.

7. The method as described in claim 1 wherein the GPU configuration is dynamically adjusted by provisioning or de-provisioning GPUs based on a current workload requirement.

8. The method as described in claim 1 wherein the compute environment is a disaggregated compute system comprising the GPUs assigned.

9. Apparatus for processing a workload in a compute environment having a pool of graphics processing units (GPUs), comprising:
   one or more hardware processors;
   computer memory holding computer program instructions executed by the hardware processors and operative to:
   receive a request to process the workload;
   responsive to receipt of the request, determine a GPU configuration anticipated to be required to process the workload, the GPU configuration comprising a set of GPU requirements including a number of GPUs and a type of GPU;
   based on the set of GPU requirements, select GPUs from the pool that are available and assign the selected available GPUs to process the workload; and
   as the workload is being processed by the GPUs assigned, dynamically adjust the GPU configuration as determined by monitored resource consumption of the workload.

10. The apparatus as described in claim 9 wherein the GPU configuration is determined at least in part by determining whether a profile of the workload matches a profile associated with another workload that has been processed in the compute environment.

11. The apparatus as described in claim 9 wherein the GPU configuration is determined at least in part by executing a test GPU configuration.

12. The apparatus as described in claim 9 wherein the computer program code to dynamically adjust the GPU configuration comprises computer program code to:
   monitor resource consumption associated with the GPUs assigned to process the workload; and
   based at least in part on the monitored resource consumption, modify the number of assigned GPUs.

13. The apparatus as described in claim 9 wherein the set of GPU requirements also include a value representing an extent to which the workload is suitable for processing on the GPUs.

14. The apparatus as described in claim 9 wherein the GPU requirements are adjusted in accordance with one or more tasks in the workload.

15. The apparatus as described in claim 9 wherein the GPU configuration is dynamically adjusted by provisioning or de-provisioning GPUs based on a current workload requirement.

16. The apparatus as described in claim 9 wherein the compute environment is a disaggregated compute system comprising the GPUs assigned.

17. A computer program product in a non-transitory computer readable medium for use in a data processing system for processing a workload in a compute environment having a pool of graphics processing units (GPUs), the computer program product holding computer program instructions executed in the data processing system and operative to:
   receive a request to process the workload;
   responsive to receipt of the request, determine a GPU configuration anticipated to be required to process the workload, the GPU configuration comprising a set of GPU requirements including a number of GPUs and a type of GPU;
   based on the set of GPU requirements, select GPUs from the pool that are available and assign the selected available GPUs to process the workload; and
   as the workload is being processed by the GPUs assigned, dynamically adjust the GPU configuration as determined by monitored resource consumption of the workload.

18. The computer program product as described in claim 17 wherein the GPU configuration is determined at least in part by determining whether a profile of the workload matches a profile associated with another workload that has been processed in the compute environment.

19. The computer program product as described in claim 17 wherein the GPU configuration is determined at least in part by executing a test GPU configuration.

20. The computer program product as described in claim 17 wherein the computer program code to dynamically adjust the GPU configuration comprises computer program code to:

monitor resource consumption associated with the GPUs assigned to process the workload; and based at least in part on the monitored resource consumption, modify the number of assigned GPUs.

21. The computer program product as described in claim 17 wherein the set of GPU requirements also include a value representing an extent to which the workload is suitable for processing on the GPUs.

22. The computer program product as described in claim 17 wherein the GPU requirements are adjusted in accordance with one or more tasks in the workload.

23. The computer program product as described in claim 17 wherein the GPU configuration is dynamically adjusted by provisioning or de-provisioning GPUs based on a current workload requirement.

24. The computer program product as described in claim 17 wherein the compute environment is a disaggregated compute system comprising the GPUs assigned.

25. A data center facility, comprising:

a set of server resource pools, the server resource pools comprising at least a graphics processing unit (GPU) resource pool;

a GPU sizing component executing in a hardware processor responsive to receipt of a request to process a workload to determine a GPU configuration that includes a number of GPUs and a type of GPU;

at least one disaggregated compute system comprising GPUs selected from the GPU resource pool to satisfy the GPU configuration; and a GPU scaling component executing in a hardware processor and responsive to receipt of resource consumption information as the workload is executing to scale-up or scale-down the GPU configuration.

26. The data center facility as described in claim 25 further include a central processing unit (CPU) resource pool, and wherein GPU-friendly workloads are assigned to respective members of a set of GPUs from the GPU resource pool while GPU-unfriendly workloads are assigned to respective members of a set of CPUs from the CPU resource pool.

* * * * *